US009144247B2

(12) United States Patent
Cretors

(10) Patent No.: US 9,144,247 B2
(45) Date of Patent: Sep. 29, 2015

(54) POPCORN POPPING MACHINES AND OTHER MACHINES HAVING FLOW THROUGH DECKS FOR POPPING POPCORN AND PRODUCING OTHER TYPES OF EXPANDED FOOD

(75) Inventor: Charles D. Cretors, Lake Forest, IL (US)

(73) Assignee: C. Cretors & Company, Wood Dale, IL (US)

( * ) Notice: Subject to any disclaimer, the term of this patent is extended or adjusted under 35 U.S.C. 154(b) by 445 days.

(21) Appl. No.: 13/452,764

(22) Filed: Apr. 20, 2012

(65) Prior Publication Data

US 2012/0266756 A1 Oct. 25, 2012

Related U.S. Application Data

(60) Provisional application No. 61/477,901, filed on Apr. 21, 2011.

(51) Int. Cl.
*A23L 1/18* (2006.01)

(52) U.S. Cl.
CPC ............... *A23L 1/18* (2013.01); *A23L 1/1812* (2013.01); *A23L 1/1815* (2013.01)

(58) Field of Classification Search
CPC ........ A23L 1/1815; A23L 1/1812; A23L 1/18
USPC ........................ 99/323.9, 323.5; 34/588, 586; 198/370.02, 370.07, 370.08, 725, 726, 198/457.01, 459.1; 118/19; 209/641, 652, 209/653, 654; 426/445, 450
See application file for complete search history.

(56) References Cited

U.S. PATENT DOCUMENTS

| 884,771 | A | * | 4/1908 | Snow | 34/236 |
| 1,251,291 | A | | 12/1917 | Scheeffer | |
| 1,308,241 | A | * | 7/1919 | Hutchinson | 34/236 |
| 1,339,662 | A | * | 5/1920 | Morgan | 99/323.8 |
| 1,436,400 | A | | 11/1922 | Mabey | |

(Continued)

FOREIGN PATENT DOCUMENTS

| DE | 8624682 | 12/1986 |
| DE | 20120429 | 7/2002 |

(Continued)

OTHER PUBLICATIONS

C. Cretors and Co.; "Diplomat" product manual for models DI20C, DI32C, D120F, DI32F, DI205, TDI205, TDI206, DI325 and TDI326; 1996, 58 pages.

(Continued)

*Primary Examiner* — Reginald L Alexander
(74) *Attorney, Agent, or Firm* — Perkins Coie LLP

(57) ABSTRACT

Systems, methods and machines for producing popcorn and other types or expanded food are disclosed herein. A machine in accordance with one embodiment includes a flow through cooking deck and a plurality of heating elements that extend along the length of the cooking deck. An agitating assembly having a plurality of paddles can be positioned above the cooking deck. A corn hopper can dispense corn kernels onto the cooking deck and the paddles of the agitating assembly can transport and agitate the corn kernels on the cooking deck. The paddles can be positioned at an angle to their direction of travel and can move the corn kernels from side to side as they move the corn kernels along the length of the cooking deck.

22 Claims, 3 Drawing Sheets

(56) References Cited

U.S. PATENT DOCUMENTS

| | | |
|---|---|---|
| 1,477,704 A | 12/1923 | Holcomb et al. |
| 1,501,114 A | 7/1924 | Howe |
| 1,867,910 A | 7/1932 | Eakins |
| 1,961,812 A | 6/1934 | Burch |
| 1,987,388 A | 1/1935 | Cretors |
| 2,123,663 A | 7/1938 | Roach |
| 2,198,152 A | 4/1940 | Cooley et al. |
| 2,232,954 A | 2/1941 | Manley |
| 2,248,812 A | 7/1941 | Cretors |
| 2,477,416 A | 7/1949 | Page |
| 2,549,449 A | 4/1951 | Gibson |
| 2,570,126 A | 10/1951 | Hobbs |
| 2,586,347 A | 2/1952 | Kloster |
| 2,604,030 A | 7/1952 | Cretors |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Denniss |
| 2,907,264 A | 10/1959 | Bushway |
| 2,939,379 A | 6/1960 | Schmitt |
| 2,984,169 A | 5/1961 | Bushway |
| 3,095,326 A | 6/1963 | Green et al. |
| 3,120,168 A | 2/1964 | Lippert |
| 3,140,952 A | 7/1964 | Cretors |
| 3,156,451 A | 11/1964 | Waas |
| 3,280,720 A | 10/1966 | Kuhn |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley et al. |
| 3,568,782 A | 3/1971 | Cox |
| 3,650,199 A | 3/1972 | Sachnik |
| 3,697,289 A | 10/1972 | Day et al. |
| 3,739,953 A | 6/1973 | Cretors |
| 3,751,267 A | 8/1973 | Sachnik |
| 3,783,854 A | 1/1974 | Hurko et al. |
| 3,812,774 A | 5/1974 | Day et al. |
| 3,930,996 A | 1/1976 | Day et al. |
| 4,120,236 A | 10/1978 | Blomberg |
| 4,152,974 A | 5/1979 | Tienor |
| 4,165,620 A | 8/1979 | Gehauf nee Kiesel et al. |
| 4,173,925 A | 11/1979 | Leon |
| 4,178,843 A | 12/1979 | Crabtree et al. |
| 4,182,229 A | 1/1980 | VandeWalker |
| 4,206,695 A | 6/1980 | Cretors |
| 4,288,686 A | 9/1981 | Cretors |
| 4,331,124 A | 5/1982 | Seidel et al. |
| 4,438,682 A | 3/1984 | King et al. |
| 4,512,247 A | 4/1985 | Friedman |
| 4,648,719 A | 3/1987 | Roben |
| 4,649,263 A | 3/1987 | Goodlaxson |
| 4,763,568 A | 8/1988 | Kiczek |
| 4,881,457 A | 11/1989 | Lyga et al. |
| 4,914,834 A | 4/1990 | Sime |
| 5,033,363 A | 7/1991 | King et al. |
| 5,035,173 A | 7/1991 | Stein et al. |
| 5,046,481 A | 9/1991 | Warwick |
| 5,069,923 A * | 12/1991 | Hubbard et al. ............. 426/445 |
| 5,083,505 A | 1/1992 | Kohlstrung et al. |
| 5,154,161 A | 10/1992 | Rogers et al. |
| 5,180,898 A | 1/1993 | Alden et al. |
| 5,203,256 A | 4/1993 | Mueller |
| 5,263,405 A | 11/1993 | Simon |
| 5,301,601 A | 4/1994 | Cretors |
| 5,311,930 A | 5/1994 | Bruenn |
| 5,315,919 A | 5/1994 | Hoeberigs |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee |
| 5,513,558 A | 5/1996 | Erickson et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,662,024 A | 9/1997 | Cretors et al. |
| 5,690,018 A | 11/1997 | Hansen |
| 5,694,830 A | 12/1997 | Hodgson et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,871,792 A | 2/1999 | Weiss et al. |
| 5,979,301 A | 11/1999 | Perttola |
| 6,000,318 A | 12/1999 | Weiss et al. |
| 6,098,526 A | 8/2000 | Stein et al. |
| 6,123,011 A | 9/2000 | Cretors |
| 6,164,192 A | 12/2000 | Stein |
| 6,164,193 A | 12/2000 | Perttola |
| 6,234,063 B1 | 5/2001 | Evers et al. |
| 6,374,727 B1 | 4/2002 | Cretors |
| 6,382,087 B1 | 5/2002 | Iiyama |
| 6,412,395 B1 | 7/2002 | Weiss et al. |
| 6,412,396 B1 | 7/2002 | Wright |
| 6,460,451 B1 | 10/2002 | Helman et al. |
| 6,534,103 B2 | 3/2003 | Weiss |
| 6,578,468 B1 | 6/2003 | Horn |
| 6,612,225 B1 | 9/2003 | Mann |
| 6,672,201 B2 | 1/2004 | Evans et al. |
| 6,872,923 B2 | 3/2005 | Cretors et al. |
| 6,914,226 B2 | 7/2005 | Ottaway |
| 7,024,986 B2 | 4/2006 | Kurosawa |
| 7,846,493 B1 | 12/2010 | Cox |
| 8,201,492 B2 | 6/2012 | Cretors |
| 8,464,634 B2 | 6/2013 | Cretors et al. |
| 8,651,014 B2 | 2/2014 | Vidojevic et al. |
| 8,794,129 B2 | 8/2014 | Cretors |
| 8,869,679 B2 | 10/2014 | Ryan et al. |
| 2003/0159591 A1 | 8/2003 | Evans et al. |
| 2004/0026404 A1 | 2/2004 | Lerner |
| 2004/0265993 A1 | 12/2004 | Darling et al. |
| 2005/0056154 A1 | 3/2005 | Fu |
| 2009/0041915 A1 * | 2/2009 | Biechteler .................... 426/450 |
| 2009/0056558 A1 | 3/2009 | Cretors et al. |
| 2009/0126579 A1 | 5/2009 | Cretors |
| 2009/0208621 A1 * | 8/2009 | Dotan ........................ 426/389 |
| 2009/0223378 A1 | 9/2009 | Cretors |
| 2011/0027434 A1 | 2/2011 | Cretors |
| 2011/0076372 A1 | 3/2011 | Cretors |
| 2011/0076373 A1 * | 3/2011 | Cretors et al. ............... 426/450 |
| 2011/0083562 A1 | 4/2011 | Ryan et al. |
| 2011/0120317 A1 | 5/2011 | Rhome |
| 2013/0276640 A1 | 10/2013 | Cretors |
| 2013/0276641 A1 | 10/2013 | Vidojevic |
| 2013/0280386 A1 | 10/2013 | Cretors |
| 2015/0064320 A1 | 3/2015 | Cretors |

FOREIGN PATENT DOCUMENTS

| | | |
|---|---|---|
| EP | 0364071 | 4/1990 |
| FR | 2401387 | 3/1979 |
| GB | 0688223 | 3/1953 |
| JP | 2006081587 A | 3/2005 |
| WO | WO9310698 | 6/1993 |
| WO | WO-9706699 A1 | 2/1997 |
| WO | WO2004054384 | 7/2004 |
| WO | WO-2012145717 A1 | 10/2012 |

OTHER PUBLICATIONS

C. Cretors and Co.; "Diplomat" product manual for models DI20CP, DI32CP, DI20FP and DI32FP; 1989, 62 pages.

C. Cretors and Co.; Multi-product sell sheet for "The New Diplomat Counter Showcase" and "Thunder Kettle" for models G48E, EPR48E5 and PR48E5; dated 1990, 2 pages.

Gold Medal Products Co.; "Funfood Equipment & Supplies" catalog; vol. 56, dated 2000, 108 pages.

LOEB Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

(56) References Cited

OTHER PUBLICATIONS

Proctor Companies; Equipment Catalog, 1992, 33 pages.
Cretors Coater Mixer Tumbler, http://www.cretors.com/store/catalog.asp?item=39&category_id=3, Copyright 2014, 1 page.
International Search Report and Written Opinion for PCT/US2008/075083; Mailed on Nov. 12, 2008; Applicant: C. Cretors and Company, 8 pages.
International Search Report and Written Opinion for PCT/EP05/009010; Mailed on Jan. 5, 2006; Applicant: Pfister and Pfister, 6 pages.
International Search Report and Written Opinion for PCT/US10/50442; Mailed on Nov. 23, 2010; Applicant: C. Cretors and Company, 10 pages.
Suspended Poppers: 20 oz., 32 oz., 48 oz., 60 oz., C. Cretors and Company, published Nov. 2004, 6 pages.
Topping & Dispensing Systems, C. Cretors and Company Product Brochure, pp. 36-39, published Oct. 2005, 5 pages.
Topping Systems, C. Cretors and Company, published Nov. 2003, 2 pages.

International Search Report and Written Opinion for PCT/US2012/03459; mailing date: Sep. 20, 2012, 7 pages.

"How to Succeed in the Carmel Corn Business," Gold Medal Products Company, Copyright 2011, gmpopcorn.com, 24 pages.

* cited by examiner

POPCORN POPPING MACHINES AND OTHER MACHINES HAVING FLOW THROUGH DECKS FOR POPPING POPCORN AND PRODUCING OTHER TYPES OF EXPANDED FOOD

CROSS-REFERENCE TO RELATED APPLICATION

This patent application claims the benefit under 35 U.S.C. §119 of U.S. Provisional Patent Application Ser. No. 61/477,901, filed Apr. 21, 2011, the disclosure of which is incorporated herein by reference in its entirety.

TECHNICAL FIELD

The present disclosure relates generally to systems and methods for popping corn and producing other types of expanded foods.

BACKGROUND

Popcorn popping machines for use in theaters, concession stands, and homes are well known. Industrial machines for making large quantities of popcorn, puffed rice, and other expanded food products for wholesale to retailers are also known. One method of industrial scale popcorn popping employs a popping kettle. To make popcorn, unpopped corn kernels and oil are placed in the kettle and heated with a gas burner or electric heating element. The cooking oil coats the kernels and ensures a relatively even distribution of heat throughout the kernel.

Agitating the kernels can prevent them from burning on the bottom of the kettle where the heat is most intense. For this reason, many popcorn machines include some type of agitator that mixes the corn kernels with the cooking oil and ensures even popping. Some machines, for example, include stirring blades that are mounted to a rotating shaft driven by an electric motor. In operation, the stirring blades sweep around the inside of the popping kettle, mixing the kernels with the cooking oil and ensuring the kernels are evenly heated. The agitators also ensure that the kernels remain in motion, which helps prevent burning and aids in uniform heating of the kernels.

DETAILED DESCRIPTION

The following disclosure is directed generally to machines for popping corn and/or producing expanded foods such as puffed snacks or cereals. Several details describing structures and processes that are well-known and often associated with popcorn machines and similar machines are not set forth in the following description to avoid unnecessarily obscuring embodiments of the disclosure. Moreover, although the following disclosure sets forth several embodiments, several other embodiments can have different configurations, arrangements, and/or components than those described herein. In particular, other embodiments may have additional elements, and/or may lack one or more of the elements described below with reference to FIGS. 1-3.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1. Moreover, the various elements and features illustrated in the Figures may not be drawn to scale.

Figure 1:
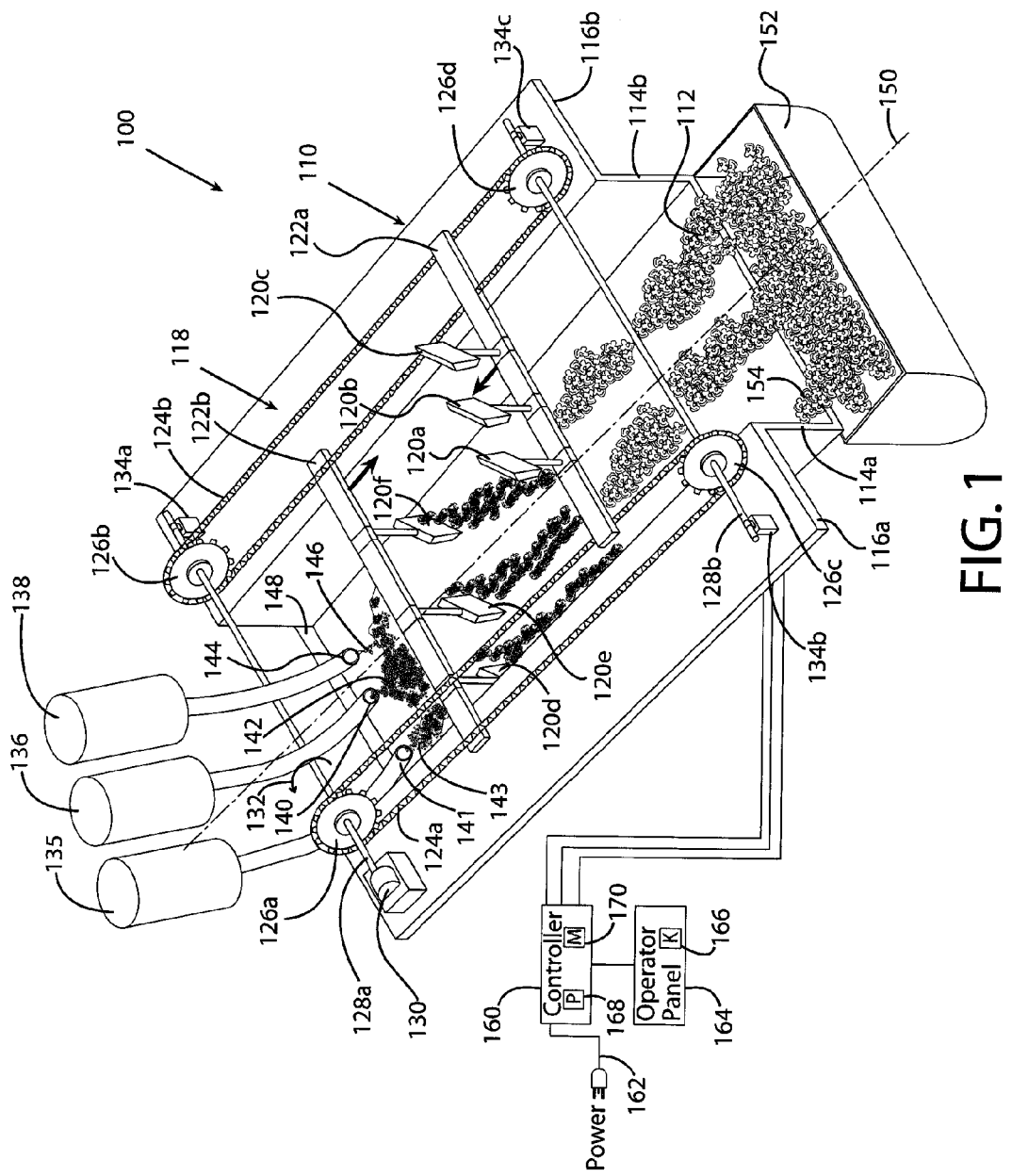
FIG. 1 is an isometric view of a popcorn popping machine configured in accordance with an embodiment of the invention.
Figure 2:
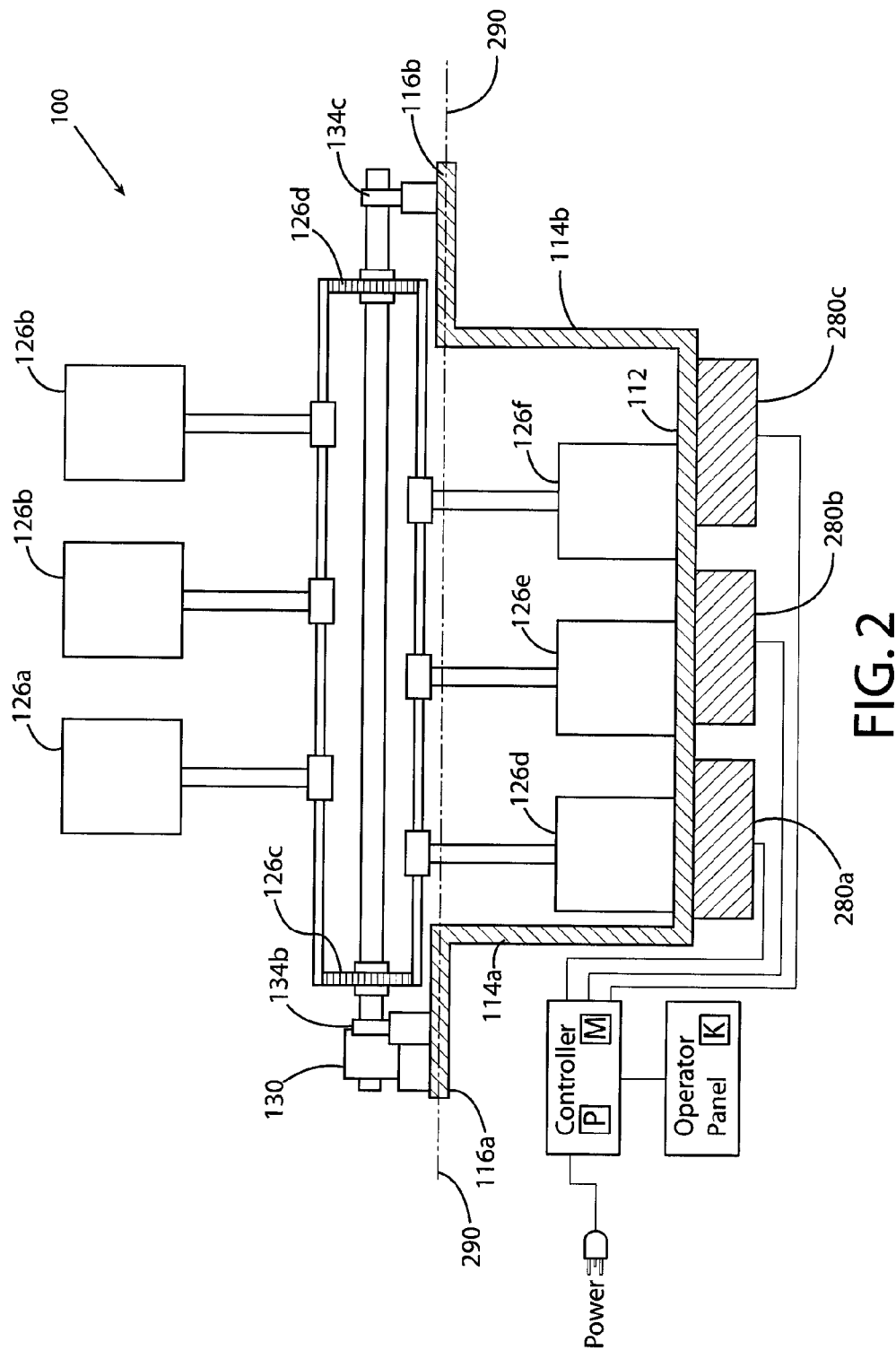
FIG. 2 is an end view of the popcorn popping machine of FIG. 1.

FIG. 1 and FIG. 2 are isometric and end views, respectively, of a food expanding machine 100 configured in accordance with an embodiment of the disclosure. In the illustrated embodiment, the food expanding machine 100 is a popcorn popping machine for popping raw corn kernels in, e.g., a large scale industrial setting. (Accordingly, for ease of reference, the food expanding machine 100 will hereinafter be referred to as a popcorn machine 100). In other embodiments, however, the machine 100 and suitable variations thereof can be used for making other types of expanded food products, such as puffed rice, puffed snacks (e.g., extruded starch snacks) and other types of expanded foods. Accordingly, while portions of the present disclosure may be directed to popcorn machines, it should be understood that various embodiments of the machines and methods described herein can be used to produce other types of expanded food products.

In the illustrated embodiment, the popcorn machine 100 includes a cooking assembly 110. The cooking assembly 110 includes a heated flow through cooking surface or deck 112, and a first side wall 114a spaced apart from an opposing second side wall 114b. The side walls 114 extend upwardly from the cooking deck 112. The cooking assembly 110 further includes a first support deck 116a and a second support deck 116b, which extend outwardly from the upper ends of the first side wall 114a and the second side wall 114b, respectively. Accordingly, the cooking assembly 110 is generally shaped in the form of a vertical walled, flat bottomed channel with extended support decks. The cooking deck 112, side walls 114, and support decks 116 can be formed from stainless steel and/or other suitable metals known in the art.

In the illustrated embodiment, a plurality of heating elements 280 are positioned proximate to the underside of the cooking deck 112 to heat the deck 112 and pop, puff, and/or expand food products placed thereon. Each of the heating elements 280 can include a resistive wire (not shown) or other element encased in a metallic casing. Each of the resistive wires can receive electric power from a controller 160 that in turn receives power from a facility outlet via a power cord 162 to generate heat. In other embodiments, other suitable heating elements (e.g., gas burners) can be used to heat the cooking deck 112. The heating elements 280 can extend along the entire length of the cooking deck 112 parallel to a longitudinal axis 150. Alternatively, the heating elements 280 may be separated into zones (not shown) that cover portions of the length of the cooking deck 112. In embodiments with separate heating zones, different temperatures can be used for the different zones, as described in U.S. patent application Ser. No. 12/891,722, filed Sep. 27, 2010 and entitled "POPCORN MACHINES AND OTHER MACHINES HAVING REVERSIBLE FOOD MOVING DEVICES FOR POPPING POPCORN AND PRODUCING OTHER TYPES OF EXPANDED FOODS," which is incorporated herein in its entirety by reference. The different temperatures in the separate heating zones can provide differential heating to the corn kernels as they travel along the cooking deck 112. The differential heating can improve the popping process and the quality of the popcorn.

In the illustrated embodiments, an agitating assembly 118 is operably attached to the support decks 116. The assembly 118 includes a plurality of agitator paddles 120 fixedly attached to a first connecting bar 122a and a second connecting bar 122b. The end portions of the connecting bars 122 are operably coupled to a first drive member, e.g., a first chain 124a and a second chain 124b. The chains 124 are operably engaged with a set of corresponding sprockets 126. The sprockets 126a and 126b are fixedly attached to a first shaft 128a (e.g., a drive shaft), and the sprockets 126c and 126d can be rotatably or fixedly attached to a second shaft 128b. The first shaft 128a is operably coupled to an electric motor 130. The electric motor 130 is operably connected to the controller 160 and configured to rotate the first shaft 128a about a longitudinal axis in a counterclockwise direction 132. The shafts 128 are rotatably attached to a plurality of journals or support stands 134. The support stands 134 are fixedly attached to the support decks 116. Although the present embodiment couples the motor 130 to the first shaft 128a, in other embodiments the first shaft 128a may be driven by a gear system, a belt system, etc.

In the illustrated embodiment, the paddles 120 are spaced apart from each other and extend outwardly from the connecting bars 122. Additionally, the paddles 120a, 120b, and 120c on the first connecting bar 122a are offset from the paddles 120d, 120e, and 120f on the second connecting bar 122b along a horizontal axis 290. Although the illustrated embodiment includes two connecting bars and six paddles, the popcorn popping machine 100 can be configured with additional (or fewer) paddles and connecting bars in different spacings. In other embodiments of the present disclosure, a belt coupled to rollers, or other similar rotating assembly, can be employed in place of the chains, sprockets, and connecting bars.

In another aspect of this embodiment, the popcorn machine 100 includes a raw corn hopper/dispenser 136, a cooking oil container/dispenser 138, and a flavoring container/dispenser 135. The flavoring dispenser 135 can contain various types of flavoring, and/or sweeteners. The flavorings and/or sweeteners can include, for example, jalapeno, cheddar cheese, cinnamon, sugar, etc. The corn hopper 136 includes a corn feed outlet 140 that dispenses unpopped corn kernels 142 onto the cooking deck 112. Similarly, an oil feed outlet 144 dispenses cooking oil 146 onto the cooking deck 112 to mix with the corn kernels 142. Also, a flavoring outlet 141 dispenses flavoring and/or sweeteners 143 onto the cooking deck 112 to mix with the corn kernels 142 and the oil 146. Additionally, the cooking assembly 110 can include a containment wall 148 that prevents the cooking oil 146, the corn kernels 142, or the flavoring and/or sweeteners 143 from spilling off the cooking deck 112. Alternatively, the cooking assembly 110 can be mounted on a slight angle so that gravitational forces ensure the cooking oil 146, corn kernels 142, and flavoring and/or sweeteners 143 do not unintentionally spill off the cooking deck 112. The popcorn machine 100 also includes a receptacle 152 to receive popped corn 154.

In the illustrated embodiment, an operator control panel 164 (shown schematically) having a keypad, one or more push-buttons or switches, and/or other user interface devices 166 is operably coupled to the controller 160. The controller 160 can include a processor 168 for executing computer-readable operating instructions stored on memory 170. The processor 168 can include a programmable logic controller (PLC) and/or other processing device suitable for executing computer-readable instructions for controlling operation of the popcorn machine 100 in accordance with operator input received via the control panel 164. For example, in one embodiment the operator may turn the popcorn machine 100 on/off, set popping time, set popping temperature, etc. via the control panel 164.

Figure 3:
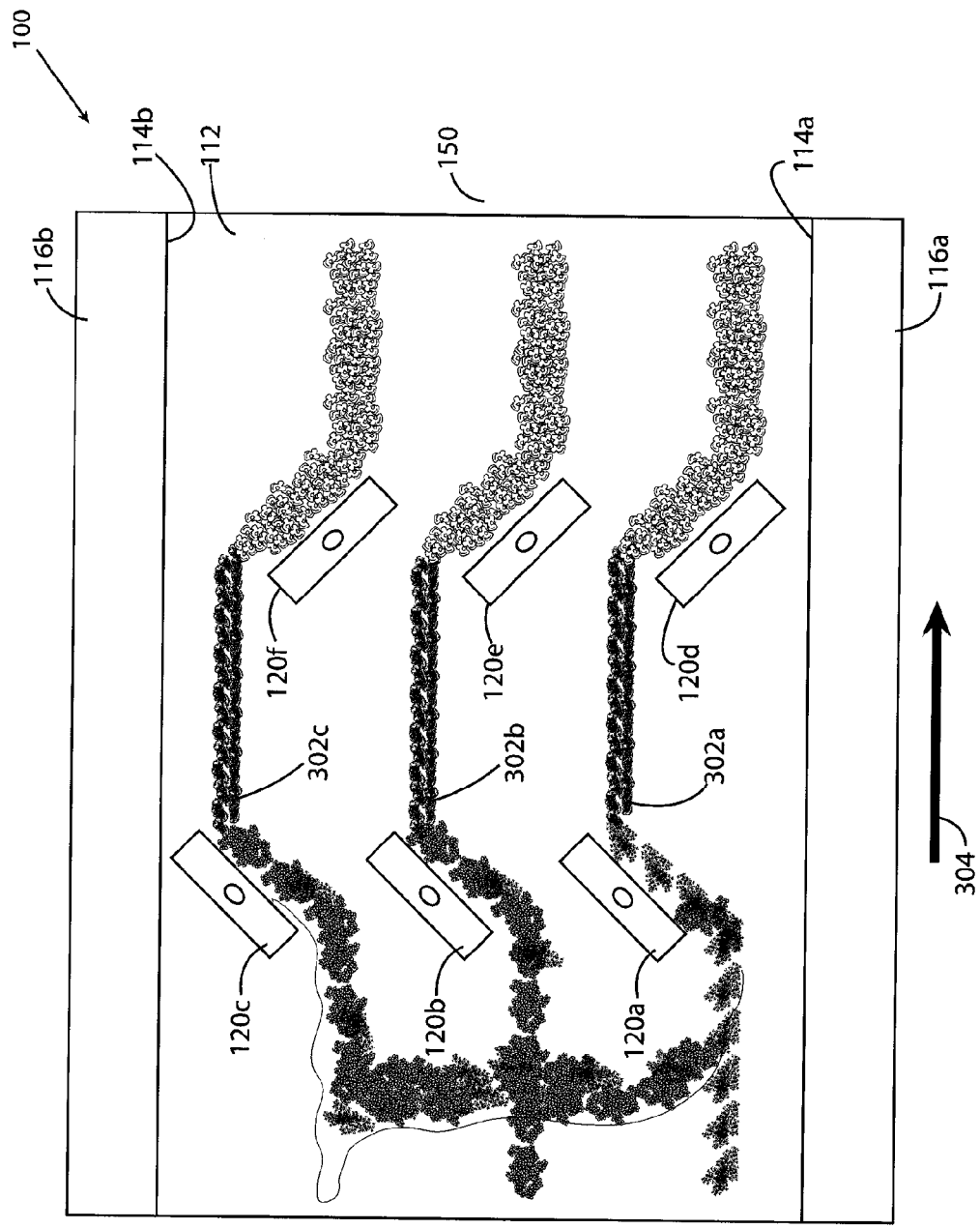
FIG. 3 is a partial top view of the popcorn popping machine of FIG. 1 and FIG. 2.

FIG. 3 is a top partial view of the popcorn popping machine of FIG. 1 and FIG. 2. In the illustrated embodiment, the paddles 120 are shown simultaneously traversing the cooking deck 112 from left to right in the direction of an arrow 304. The popcorn machine 100 can be configured with additional connecting bars and paddles to allow for the paddles of multiple connecting bars to simultaneously engage the cooking deck 112. However, in operation, the illustrated embodiment of popcorn machine 100 would have three paddles traversing the cooking deck 112, and three in a raised returning position. The paddles 120 can be positioned at an angle to the longitudinal axis 150, as shown in FIG. 3. Furthermore, the paddles 120a-c can be positioned at a first angle, and the paddles 120d-f can be positioned at a second, opposite angle. For example, in the illustrated embodiment, the paddles 120a-c can each be positioned at an angle of approximately 45 degrees counter-clockwise from the longitudinal axis 150, and the paddles 120d-f can be positioned at an angle of approximately 45 degrees clockwise from the longitudinal axis 150. In other embodiments, the paddles 120 can be positioned at different angles. For example, in various embodiments, the paddles 120 can be positioned at angles between 5 degrees and 85 degrees, such as between 5 degrees and 75 degrees. In further embodiments, the paddles 120 can be positioned at angles of from about 10 degrees to about 60 degrees, or from about 20 degrees to about 50 degrees. Additionally, the angles of the paddles 120 can vary for different paddles on the same connecting bar 122 (FIG. 1), or from connecting bar 122 to connecting bar 122. For example, the paddles 120 can be at different angles on each of two or more connecting bars 122.

The controller 160 provides electric power to the heating elements 280 and the motor 130 in response to operator inputs via the control panel 164. The electric power causes the electric motor 130 to rotate the first shaft 128a as the popcorn kernels 142, oil 146, and flavoring and/or sweeteners 143 are dispensed onto the cooking deck 112. As the first shaft 128a rotates, the attached sprockets 126a and 126b cause the chains 124 to travel parallel to the longitudinal axis 150 of the cooking assembly 110. Accordingly, the attached connecting bars 122 and agitator paddles 120 also move parallel to the axis 150. As the paddles 120 in the lower position move along the cooking deck 112, they push the oil 146, flavoring and/or sweeteners 143 and unpopped corn kernels 142 into a series of ridges 302. The paddles 120a, 120b, and 120c push the ridges 302 both in the direction of arrow 304, and towards the first side wall 114a. The paddles 120d, 120e, and 120f push the ridges 302 both in the direction of arrow 304, and toward the second side wall 114b. In this manner, the ridges 302 are moved from side to side as they progress along the cooking deck 112. The agitation by the paddles 120 ensures the corn kernels 142 are coated in oil 146; mixes in the flavoring and/or sweeteners 143, prevents the kernels 142 from burning; and ensures even heating of the kernels 142. As the corn kernels 142 move along the cooking deck 112 they are heated until they pop. The popped corn 154 is urged by the paddles 120 off the cooking deck 112 and into the receptacle 152.

From the foregoing, it will be appreciated that specific embodiments of the invention have been described herein for purposes of illustration, but that various modifications may be made without deviating from the spirit and scope of the various embodiments of the invention. For example, the popping machines disclosed herein can include differing numbers of agitator paddles; differing ways of attaching and moving the agitator paddles; and differing ways of providing the unpopped corn kernels, oil, and/or other ingredients. Moreover, while various advantages and features associated with certain embodiments of the invention have been described above in the context of those embodiments, other embodiments may also exhibit such advantages and/or features, and not all embodiments need necessarily exhibit such advantages and/or features to fall within the scope of the disclosure. Accordingly, the invention is not limited, except as by the appended claims.

I claim:

1. A popcorn popping machine comprising:
    a cooking deck positioned at an angle to horizontal and having a longitudinal axis;
    a heating element positioned proximate to the cooking deck; and
    an agitating assembly including—
        a first drive member and a second drive member;
        a connecting bar operably coupled to the first drive member and the second drive member; and
        a plurality of paddles fixedly attached to the connecting bar, wherein the paddles are retained in a fixed position relative to the connecting bar and are positioned at an angle relative to the longitudinal axis, and wherein the paddles are configured to travel along the cooking deck transporting and agitating corn and popped corn.

2. The popcorn popping machine of claim 1, further comprising a plurality of heating elements positioned proximate to the cooking deck, the heating elements forming multiple heating zones along the longitudinal axis of the cooking deck.

3. The popcorn popping machine of claim 1 wherein the angle is a first angle, wherein the plurality of paddles is a first plurality of paddles, wherein the connecting bar is a first connecting bar, and wherein the agitating assembly further includes:
    a second plurality of paddles;
    a second connecting bar operably coupled to the first drive member and the second drive member, wherein the first plurality of paddles are carried by the first connecting bar at the first angle relative to the longitudinal axis, and the second plurality of paddles are carried by the second connecting bar at a second angle, different than the first angle, relative to the longitudinal axis; and
    wherein the drive member transports the first connecting bar, the second connecting bar, and the plurality of paddles in a loop that extends adjacent to the cooking deck.

4. The popcorn popping machine of claim 1, further comprising means for heating the cooking deck to different temperatures in different zones.

5. The popcorn popping machine of claim 1, further comprising a containment wall adjacent the cooking deck to reduce spills.

6. The popcorn popping machine of claim 1 wherein the agitating assembly further comprises:
    a motor; and
    first and second sprockets operably coupled to the motor, wherein—
        the first drive member is operably coupled to the first sprocket and disposed toward a first side of the cooking deck;
        the second drive member is operably coupled to the second sprocket and disposed toward a second side of the cooking deck, opposite to the first side; and
        operation of the motor rotates the sprockets to drive the first and second drive members, and move the paddles.

7. The popcorn popping machine of claim 1, further comprising—
    a corn hopper configured to dispense unpopped corn onto the cooking deck; and
    a cooking oil dispenser configured to dispense cooking oil onto the cooking deck.

8. The popcorn popping machine of claim 7, further comprising a flavoring dispenser configured to dispense at least one of flavoring or sweeteners onto the cooking deck.

9. The popcorn popping machine of claim 1 wherein the angle of the paddles is between 5 degrees and 85 degrees relative to the longitudinal axis.

10. The popcorn popping machine of claim 1 wherein the first drive member comprises a first chain, and the second drive member comprises a second chain.

11. The popcorn popping machine of claim 1 wherein the first drive member comprises a first endless loop, and the second drive member comprises a second endless loop.

12. The popcorn popping machine of claim 1 wherein the first drive member comprises a first endless belt, and the second drive member comprises a second endless belt.

13. A popcorn popping machine comprising:
    a cooking assembly having a flow through cooking deck positioned at an angle to horizontal and having a longitudinal axis, a first side wall and an opposing second side wall, the first side wall and the second side wall extending upwardly from the cooking deck;
    a corn hopper positioned proximate to the cooking deck and configured to deliver unpopped corn kernels to the cooking deck;
    an oil dispenser positioned proximate to the cooking deck and configured to deliver cooking oil to the cooking deck;
    a plurality of heating elements extending along the length of the cooking deck; and
    a plurality of paddles positioned to move the corn kernels and oil along the cooking deck between the first side wall and the second side wall in a direction having both 1) a component parallel to the longitudinal axis, and 2) a component perpendicular to the longitudinal axis.

14. The popcorn popping machine of claim 13 wherein the plurality of heating elements are positioned to define heating zones, the heating zones having different operating temperatures.

15. The popcorn popping machine of claim 13, further comprising a dispenser configured to dispense flavoring onto the cooking deck.

16. The popcorn popping machine of claim 13 wherein the plurality of paddles includes a first plurality of paddles positioned at a first angle relative to the longitudinal axis, and a second plurality of paddles positioned at a second angle relative to the longitudinal axis.

17. The popcorn popping machine of claim 16 wherein the first angle is between is between 5 degrees and 85 degrees counter-clockwise from the longitudinal axis, and wherein the second angle is between 5 degrees and 85 degrees clockwise from the longitudinal axis.

18. A method for popping corn, the method comprising:
    positioning a cooking deck at an angle to horizontal to reduce any spilling of cooking oil;

dispensing unpopped corn kernels and oil onto the cooking deck;

moving the unpopped corn kernels and oil with a plurality of paddles that travel parallel to a longitudinal axis of the cooking deck, wherein moving the unpopped corn kernels and oil includes both 1) moving the unpopped corn kernels in a direction parallel to the longitudinal axis and 2) moving the unpopped corn kernels and oil in a direction perpendicular to the longitudinal axis; and providing differential heating to the cooking deck with a plurality of heating elements to heat and pop the unpopped corn kernels to produce popcorn.

19. The method of claim 18 wherein moving the unpopped corn kernels and oil with a plurality of paddles includes moving the plurality of paddles in the direction of the longitudinal axis with the paddles positioned at an angle relative to the longitudinal direction.

20. The method of claim 18, further comprising dispensing flavoring onto the cooking deck.

21. The method of claim 18, further comprising moving the paddles in a loop that extends adjacent the cooking deck.

22. The method of claim 18 wherein moving the unpopped corn kernels and oil with a plurality of paddles includes moving a sprocket and a drive member to move the connecting bar.

\* \* \* \* \*